US010110846B2

United States Patent
Chen et al.

(10) Patent No.: US 10,110,846 B2
(45) Date of Patent: Oct. 23, 2018

(54) COMPUTATIONALLY EFFICIENT FRAME RATE CONVERSION SYSTEM

(71) Applicant: Sharp Laboratories of America, Inc., Camas, WA (US)

(72) Inventors: Xu Chen, Vancouver, WA (US); Petrus J. L. Van Beek, Camas, WA (US)

(73) Assignee: SHARP LABORATORIES OF AMERICA, INC., Camas, WA (US)

( * ) Notice: Subject to any disclaimer, the term of this patent is extended or adjusted under 35 U.S.C. 154(b) by 265 days.

(21) Appl. No.: 15/014,304

(22) Filed: Feb. 3, 2016

(65) Prior Publication Data

US 2017/0223308 A1 Aug. 3, 2017

(51) Int. Cl.
| | |
|---|---|
| H04N 7/01 | (2006.01) |
| H04N 11/20 | (2006.01) |
| G06K 9/00 | (2006.01) |
| G06T 7/215 | (2017.01) |
| G06T 7/246 | (2017.01) |

(52) U.S. Cl.
CPC ....... *H04N 7/0127* (2013.01); *G06K 9/00744* (2013.01); *G06K 9/00758* (2013.01); *G06T 7/215* (2017.01); *G06T 7/246* (2017.01); *G06T 2207/10016* (2013.01); *G06T 2207/20021* (2013.01); *H04N 7/014* (2013.01); *H04N 7/0137* (2013.01)

(58) Field of Classification Search
CPC .... H04N 7/0127; H04N 7/0137; H04N 7/014; G06T 7/204; G06K 9/00758; G06K 9/00744

USPC .......................................... 348/441
See application file for complete search history.

(56) References Cited

U.S. PATENT DOCUMENTS

| | | | |
|---|---|---|---|
| 8,660,296 B1 | 2/2014 | Ioffe | |
| 9,177,225 B1 | 11/2015 | Cordova-Diba et al. | |
| 2003/0189980 A1 | 10/2003 | Dvir et al. | |
| 2010/0231593 A1* | 9/2010 | Zhou | G06T 3/4007 345/428 |
| 2011/0001884 A1 | 1/2011 | Iketani | |
| 2011/0310295 A1* | 12/2011 | Chen | H04N 19/577 348/441 |
| 2015/0310626 A1 | 10/2015 | Yamamoto et al. | |

FOREIGN PATENT DOCUMENTS

| | | |
|---|---|---|
| CN | 103345736 A | 10/2013 |
| WO | 2012142505 A2 | 10/2012 |
| WO | 2015033501 A1 | 12/2015 |

OTHER PUBLICATIONS

T. Ahonen et al., Face Description with Local Binary Patterns: Application to Face Recognition, IEEE Transactions on Pattern Analysis and Machine Intelligence, vol. 28, No. 12, Dec. 2006, 5 pgs.

M. Calonder et al., Brief: Computing a local binary descriptor very fast, IEEE Transactions on Pattern Analysis and Machine Intelligence, vol. 34, Jul. 2012, 29 pgs.

(Continued)

*Primary Examiner* — Michael Lee
*Assistant Examiner* — Omer Khalid
(74) *Attorney, Agent, or Firm* — ScienBiziP, P.C.; Steve Reiss (57) ABSTRACT

A system for frame rate conversion of a video that includes the use of key points.

16 Claims, 9 Drawing Sheets

(56) References Cited

OTHER PUBLICATIONS

E. Rosten et al., Faster and Better: A Machine Learning Approach to Corner Detection, IEEE Transactions on Pattern Analysis and Machine Intelligence, vol. 32, Issue 1, 2010, 15 pgs.
Micusik et al., Omnidirectional Camera Model and Epipolar Geometry Estimation by RANSAC with Bucketing, Image Analysis, Lecture Notes in Computer Vision, Jun. 2003, 9 pgs.
D. Lowe, Distinctive Image Features from Scale Invariant KeyPoints, International Journal of Computer Vision, vol. 60, Issue 2, 2004, 28 pgs.
M. Fischler et al., Random Sample Consensus: A Paradigm for Model Fitting with Applications to Image Analysis and Automated Cartography, Graphics and Image Processing, Communications of the ACM, vol. 24, No. 6, Jun. 1981, 15 pgs.
International Search Report, dated Apr. 18, 2017, PCT International Patent App. No. PCT/JP2017/002526, Sharp Kabushiki Kaisha, 6 pgs.
Montoliu, R., et al., "Multiple Parametric Motion Model Estimation and Segmentation," Proceedings of 2001 Int. Conf. on Image Processing, 2001, Oct. 10, 2001, 6 pgs.

\* cited by examiner

COMPUTATIONALLY EFFICIENT FRAME RATE CONVERSION SYSTEM

CROSS-REFERENCE TO RELATED APPLICATIONS

None.

BACKGROUND OF THE INVENTION

The present invention relates to frame rate conversion.

For a digital video system, the video is encoded and decoded using a series of video frames. Frames of a video are captured or otherwise provided at a first frame rate, typically a relatively low frame rate (e.g., 24 Hz or 30 Hz). A video presentation device often supports presenting the video at a second frame rate, typically a relatively high frame rate (e.g., 60 Hz or 120 Hz). With the difference in the frame rates, the video frame rate is modified from the first frame rate to the second frame rate using a frame rate up conversion process. Frame rate conversion may be used to match the frame rate of the video to the display refresh rate which tends to reduce video artifacts, such as motion judder. In addition, frame rate conversion also tends to reduce motion blur on liquid crystal displays due to the hold-type nature of liquid crystal displays.

Frame rate up conversion techniques may create interpolated frames using received frames as references or may create new frames using frame repetition. The new video frames that are generated may be in addition to or in place of the frames of the input video, where the new frames may be rendered at time instances the same as and/or different from the time instances that the input frames are rendered. The frame interpolation may be based upon using a variety of different techniques, such as using a frame interpolation technique based on motion vectors of the received frames, such that moving objects within the interpolated frame may be correctly positioned. Typically, the motion compensation is carried out on a block by block basis. While the motion compensated frame rate up conversion process provides some benefits, it also tends to be computationally expensive. Conventional block-by-block motion vector estimation methods do not consider which aspects of the moving image are salient and relevant to achieving high image quality frame interpolation.

Accordingly, there is a need to determine motion based effects for frame rate conversion that is based upon a sufficiently accurate measure of the motion at a significantly reduced computational cost, without the need to determine highly accurate motion vectors. It is also desirable to describe the motion between frames with a reduced number of parameters, in order to reduce computational cost. It is also desirable to retain a sufficiently accurate rendition of the motion between frames so as to achieve high quality frame interpolation.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Frame rate conversion generally consists of two parts, namely, motion estimation and motion compensated frame interpolation. The most computationally expensive and resource intensive operation tends to be the motion estimation. For example, motion estimation may be performed by using block matching or optical flow based techniques. A block matching technique involves dividing the current frame of a video into blocks, and comparing each block with multiple candidate blocks in a nearby frame of the video to find the best matching block. Selecting the appropriate motion vector may be based upon different error measures, such as a sum of absolute differences, and a search technique, such as for example 3D recursive searching.

Improved search techniques in block matching may be used to reduce the time required for matching. However with increasingly greater resolutions, such as 4K and 8K video resolutions, the computational complexity (i.e., the time necessary for matching) increases substantially. Rather than developing increasingly sophisticated block matching techniques for frame rate conversion, it is desirable to use a computationally efficient motion estimation scheme relying on a sparse key point matching technique. The sparse key points may be leveraged to capture an estimation of the motion of a video sequence.

Figure 1:
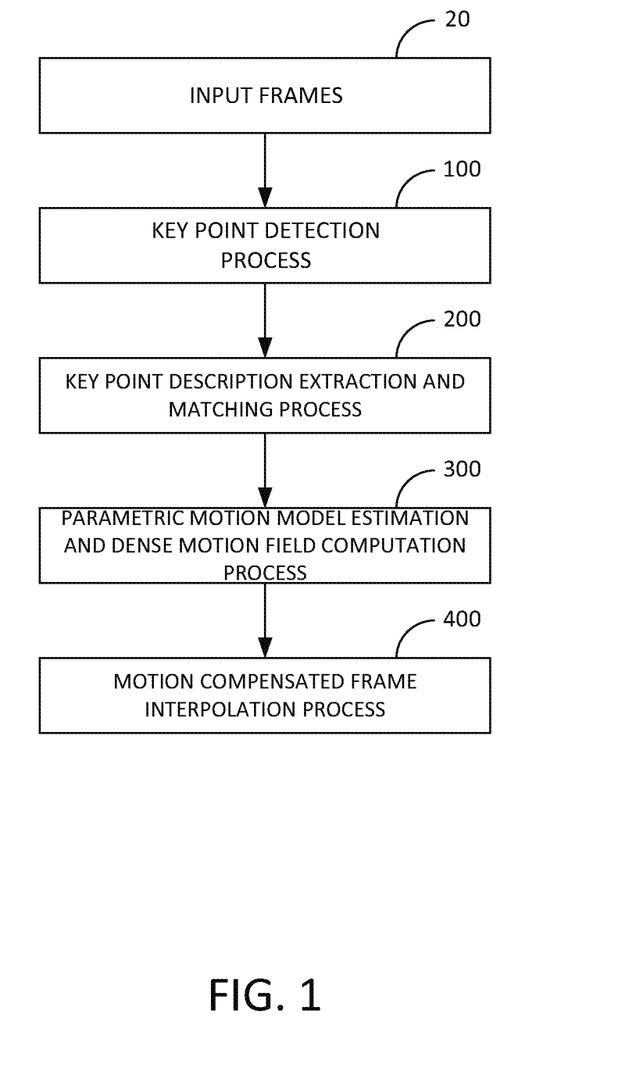
FIG. 1 illustrates a frame rate conversion based upon spare key point matching.

Referring to FIG. 1, an overview of a framework for frame rate conversion based upon sparse key points is illustrated. A series of input frames 20 are provided to a key point detection process 100. The key point detection process 100 determines a set of key points for each of the input frames 20, which may be coupled with a distribution control process. The results of the key point detection process 100 may be provided to a key point description extraction and matching process 200. The result of the key point description extraction and matching process 200 may be provided to a parametric motion model estimation and dense motion field computation process 300. The result of the parametric motion model estimation and dense motion field computation process 300 may be provided to a motion compensated frame interpolation process 400 to provide the resultant frame rate conversion.

Figure 2:
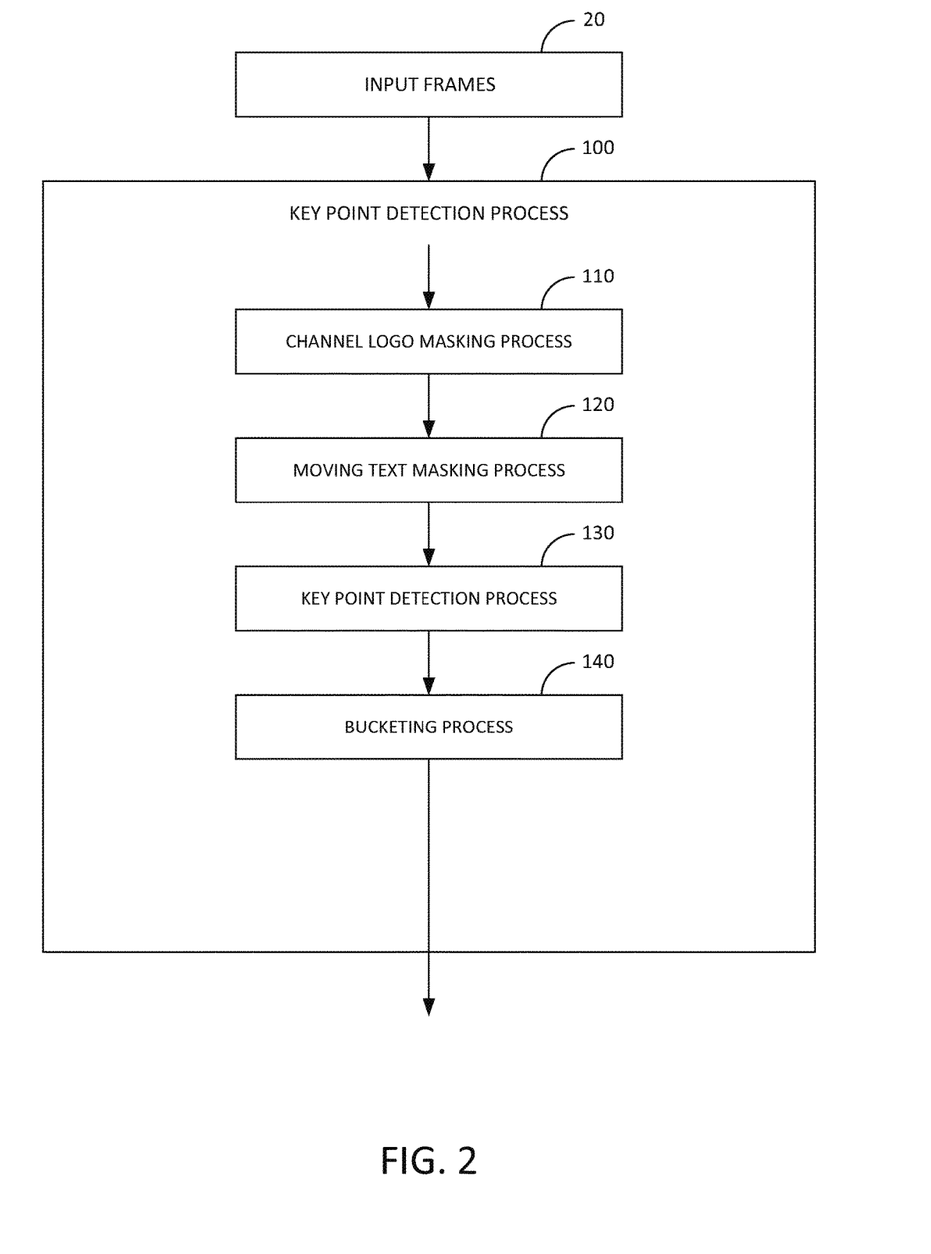
FIG. 2 illustrates an exemplary key point detection process for the frame rate conversion process of FIG. 1.

Referring to FIG. 2, the key point detection process 100 may receive the series of input frames 20. It was determined that channel logos and moving text, such as subtitles, share a different type of motion as compared to the dominant motion of the image or parts thereof. The difference in the dominant motions as a result of including the channel logos and moving text in the parametric model estimation tends to lead to inaccurate dominant motion estimation of the frame. To reduce the effects of such channel logos and moving text, they may be detected and masked out from being considered together with the other motion in the frame. A channel logo masking process 110 and/or a moving text masking process 120 may process the input frame 20 to determine edge and/or corner information to identify such aspects of the frame. Other techniques may likewise be used to identify the channel logo and the moving text of the frame. The identified aspects may be masked out (e.g., the effects of such identified aspects reduced) from the subsequent key point detection process.

Each of the input frames 20, preferably after the channel logo masking process 110 and the moving text masking process 120, is processed by a key point detection process 130 to identify strong edge and/or corner locations as key points. One technique to identify key points is using features from an accelerated segment test detector. Other techniques may likewise be used, as desired. Together with the identification of the key points, the key point detection process 130 may also determine a detection score that is representative of the strength and/or the confidence of the detection. Moreover, a generally uniform distribution in the key points is generally desirable for an unbiased and increased accuracy of motion estimation.

To increase the accuracy in the characterization of motion in an area of the frame, it is desirable to achieve a suitable distribution of key points in that area. Preferably, the distribution of the key points is controlled to achieve more uniform global distribution. To improve the distribution of key points which increases the motion estimation accuracy and to reduce the number of redundant key points which decreases the computational complexity, a bucketing process 140 may be applied to the key points from the key point detection process 130.

Figure 3:
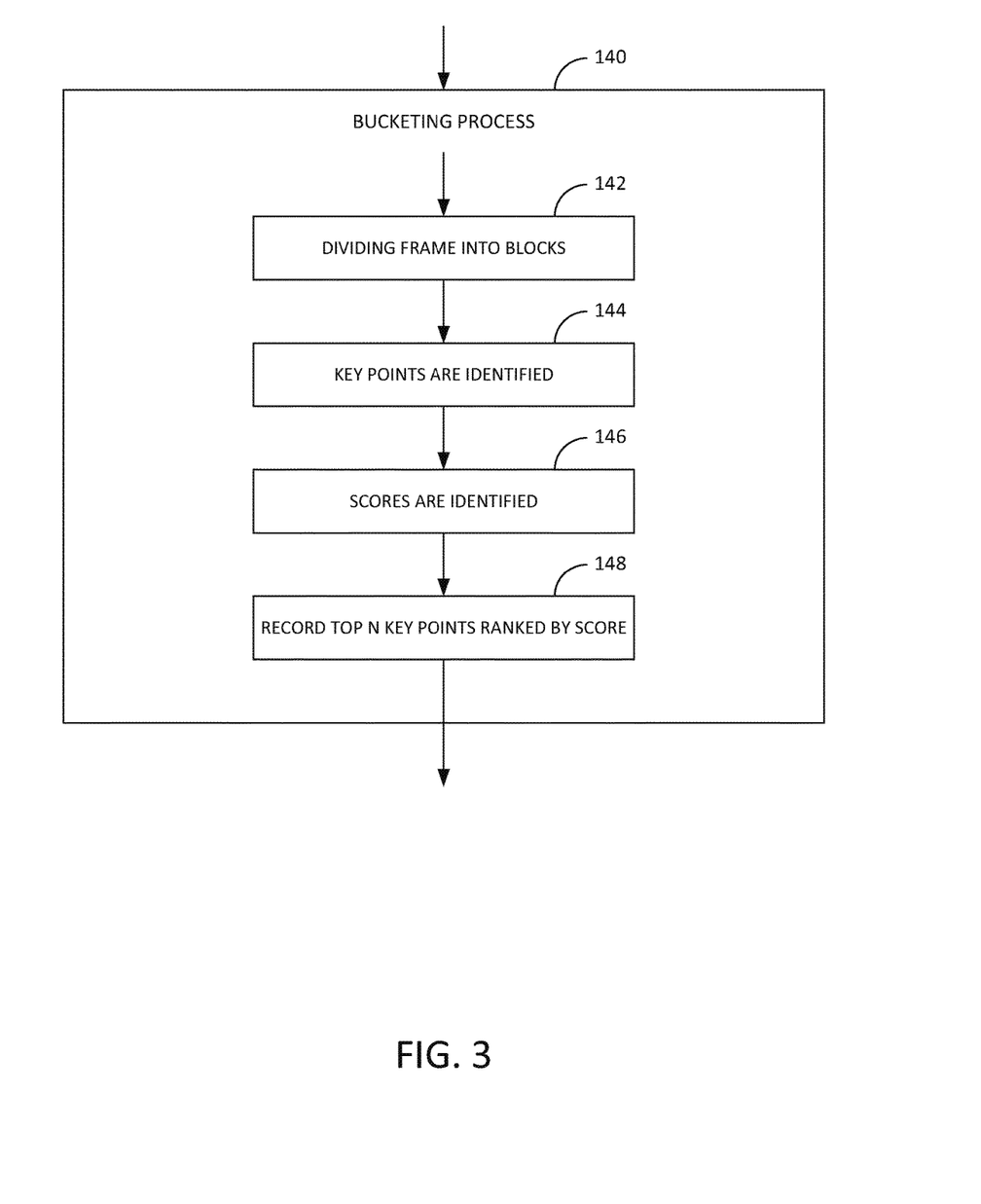
FIG. 3 illustrates an exemplary bucketing process for the key point detection process of FIG. 2.

Referring to FIG. 3, one exemplary technique for the bucketing process 140 may include dividing the frame into blocks 142, which are preferably non-overlapping. For each of the blocks, the key points are identified 144 that are included within the block as a result of the key point detection process 130. Also, for each of the blocks, the scores are identified 146 that correspond with each of the identified key points 144 as a result of the key point detection process 130. For each of the blocks, the bucketing process 140 records the top N key points ranked by the score 148. For example, if N is 3, then the top three key points with the highest detection scores are recorded for the block. If the number of key points in the block is less than or equal to N, then all the key points are recorded for the block. Those key points that are not recorded may be discarded, if desired. With this reduction process the total number of potential key points tends to be significantly reduced together with an improved key point distribution.

Figure 4:
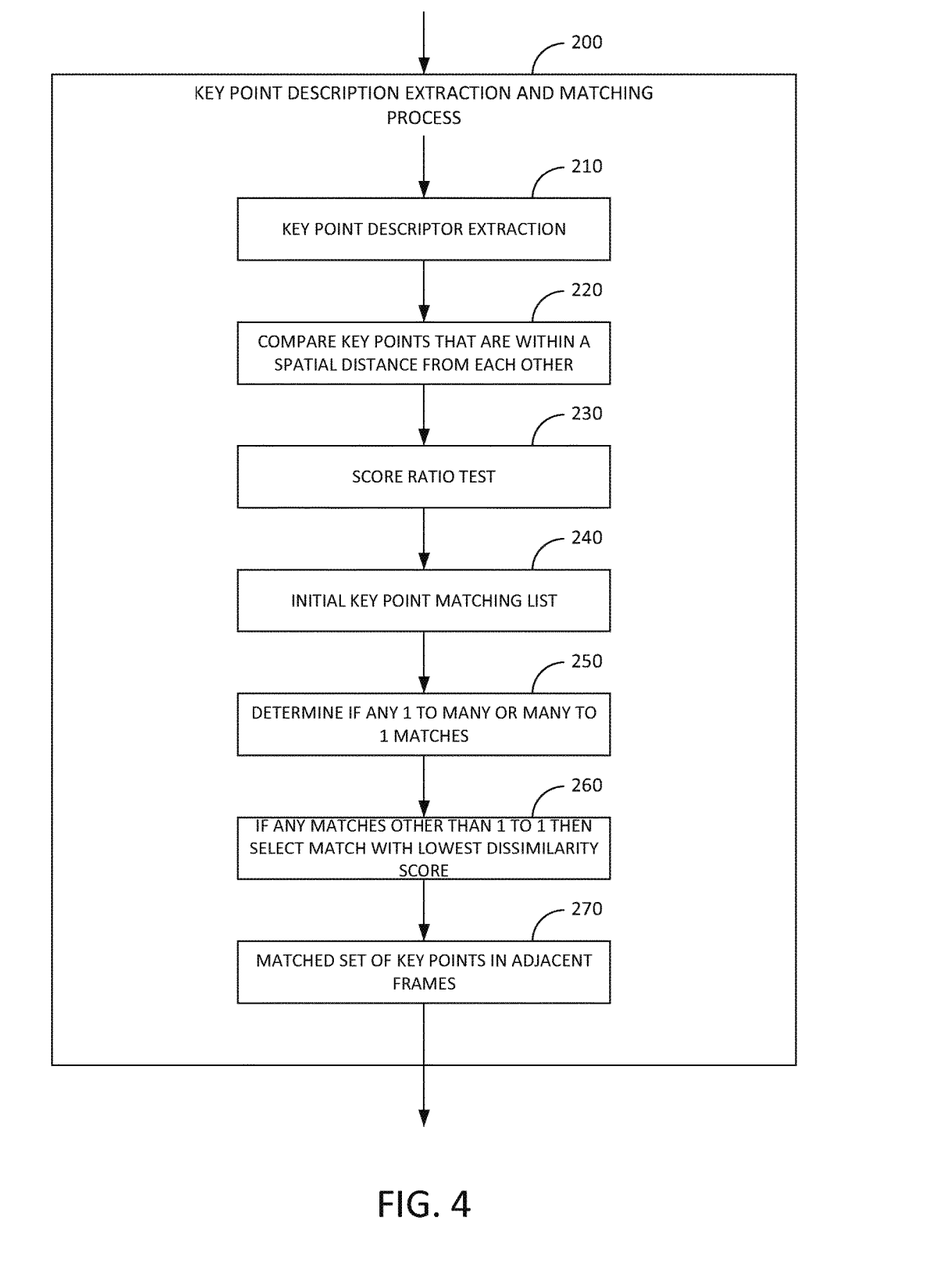
FIG. 4 illustrates an exemplary key point description extraction and matching process for the frame rate conversion process of FIG. 1.

Referring to FIG. 4, after the key points are detected 100 preferably together with a distribution control, the key point description extraction and matching process 200 is performed. For each key point in a first frame, it is desirable to search for the "best" matching key point in a second frame, and vice versa. Hence, the goal is to establish a sufficient number of one-to-one key point correspondences between the two frames. In the case of frame rate conversion, the first and second frame may be adjacent frames, if desired, in a video sequence. Preferably, sequential frames are used but other sets of frames may be used, as desired.

A key point descriptor extraction 210 may be used to characterize key points, such as using a scale invariant feature transform (SIFT), a speeded up robust features (SURF), a binary robust independent elementary features (BRIEF), an oriented brief (ORB), and other descriptors. Preferably, an intensity feature is used for key point characterizing to reduce computational complexity. The pixel intensity feature may consist of simple gray-level or color values. Centering on the detected key points, intensity patches with a defined size, such as 15 pixels by 15 pixels, may be extracted and vectorized for key point matching. Preferably, based upon the key point descriptor extraction 210 a descriptor similarity or dissimilarity measured is utilized, such as an Euclidean distance between feature vectors, or city-block distance, or a binary Hamming distance.

The input images may be optionally down-sampled prior to key point descriptor extraction, or the key point descriptor extraction may be applied jointly with down-sampling.

A local spatial constraint is applied to the key point matching to reduce the number of matching operations. For example, for each detected key point, the key point descriptor in a first frame may be compared to the key point descriptors in the adjacent frame(s) when the key points are within a specified spatial distance from each other 220, based on a suitable distance measure such as the Euclidean distance or city-block distance. The range of the search for matching key points may be bounded by a threshold value. For example, the threshold may be 50 pixels, with key points out of this range not being considered for matching. The result is the matching of the descriptor of each of the key points of the first frame to zero or more key point descriptors of the second frame.

Since each key point in a first frame may potentially match multiple key points in another frame, such as the second frame, it is desirable to determine which is the best match. To more accurately select among the potential multiple key point matches, a ranking of the similarity or dissimilarity scores of all the candidate matching key points may be used. To reduce the likelihood of false or weak matches, it is beneficial to utilize a score ratio test 230, such as for each key point determine the ratio of the dissimilarity scores of the second best match and the best match. If the ratio is smaller than a threshold, it indicates that the match is ambiguous and weak, and therefore should be removed from an initial key point matching list 240. In addition, in order to guarantee a one-to-one matching and to further improve matching accuracy, if there are multiple key points in the second frame selected to match the same point in the first frame 250, the match with the lowest dissimilarity score is retained and the others are discarded 260. The result is a matched set of key points in adjacent frames 270.

Referring again to FIG. 1, given a set of matched key points in adjacent frames 270 as a result of the key point description extraction and matching process 200 then the parametric motion model estimation and dense motion field computation process 300 is performed. One technique for parametric motion estimation based on a set of matching key points is a random sample consensus (RANSAC) technique 310. The random sample consensus technique is capable of estimating the motion with a few parameters using a parametric model while identifying the outliers from two sets of matched points. Preferably a six parameter affine transformation model is used. As alternatives, a two parameter translation model, a three parameter rigid transformation model, a four parameter similarity transformation model, or an eight parameter projective transformation model may be used. Other techniques to estimate motion may likewise be used, such as histogram based techniques, a Hough Transform, or other statistical techniques.

Figure 5:
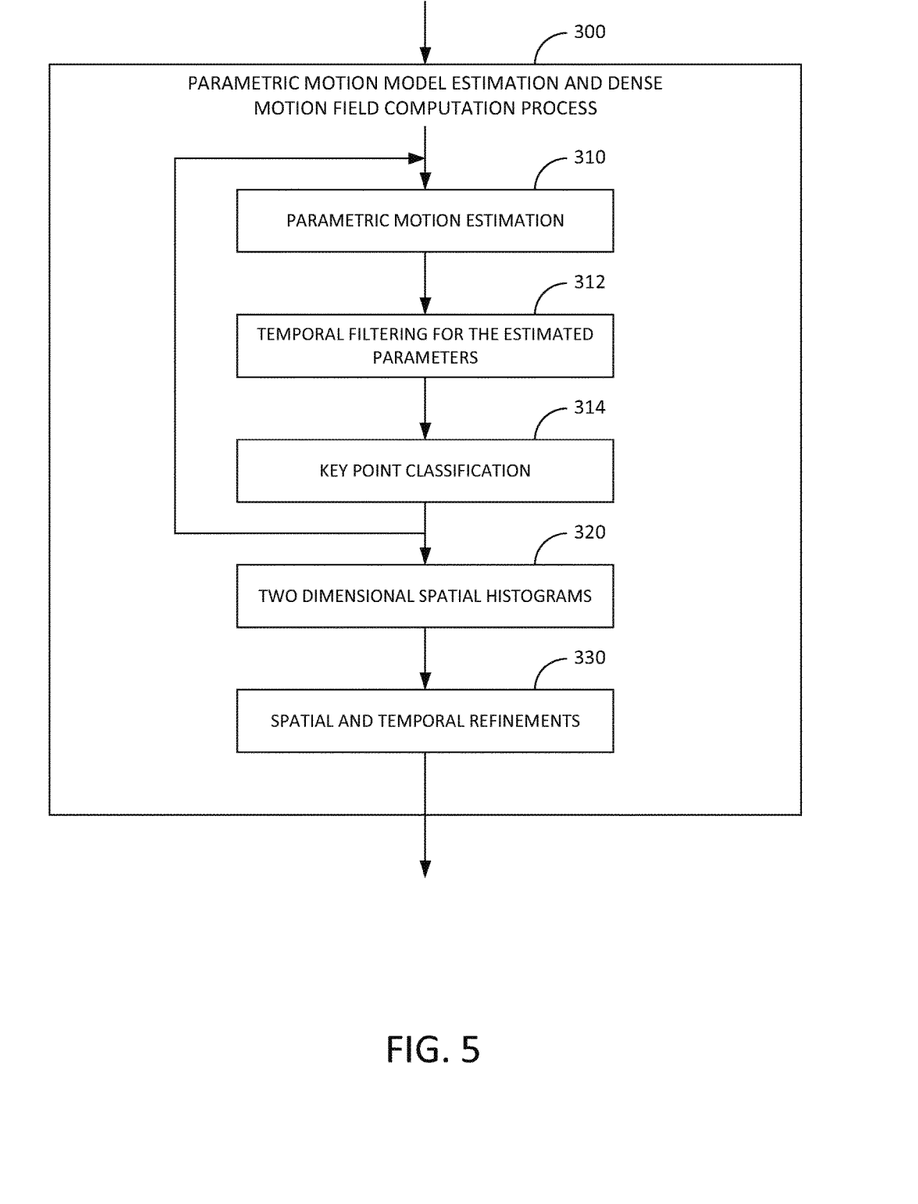
FIG. 5 illustrates an exemplary parametric motion model estimation and dense motion field computation process for the frame rate conversion process of FIG. 1.

Referring also to FIG. 5, in order to improve the stability of the random sample consensus technique 310 using the parametric motion estimation, temporal recursive filtering 312 may be applied on the estimated parameters as follows: $X(t)=\alpha*X(t-1)+(1-\alpha)*x(t)$. $x(t)$ represents the current estimated parameters without filtering at the time stamp t, $X(t-1)$ represents the filtered estimated parameters at the time stamp t−1, and $\alpha$ is a weight to control the strength of the temporal filtering process and may be set to 0.4 as an example. This technique requires only a few calculations, since the number of motion parameters is relatively low, such as 6 for the preferred affine model. Other techniques for temporal filtering of initial parametric motion models may be used likewise, such as non-recursive filtering or non-linear filtering.

After the first parametric model is estimated using the random sample consensus matching 310, further based upon the temporal filtering for the estimated parameters 312 if desired, for the dominant motion in the frame the system may proceed to estimate the motion of additional moving objects in the frame. To estimate the motion of the additional moving objects, the matched key points may be classified into three classes 314. The first class may be key points associated with the background or dominant motion. The second class may be the key points of a moving object that are different from the background or dominant motion. The third class may be outliers, which are incorrect matches or matches that do not otherwise fit any specific parametric motion that has been estimated. The key points associated with the background or dominant motion, referred to as the first class, correspond to the inliers of the initial parametric motion estimation process, which may be based on the random sample consensus technique. The random sample consensus technique separates the key points in the background or dominant regions referred to as the first class from the rest referred to as the second and third classes. The key points referred to in the second and third classes may be identified by the removal of the background or dominant regions referred to as the first class.

In order to estimate the motion of additional moving objects, the system may repeat the process of parametric motion estimation 310, temporal filtering 312, and key point classification 314. The motion of such moving objects may be determined using a suitable technique, such as the random sample consensus technique, or a histogram based motion estimation technique. Further, the system may use a simplified technique, such as using zero motion for the object. With the remaining key points not included in the background or dominant regions, the system may classify the remaining matched key points into an object class (e.g., second class) where the motion is estimated and the outlier class (e.g., third class) where the motion is not estimated. The object class (e.g., second class) and the outlier class (e.g., third class) key points may be distinguished between one another based on the outliers identified by the random sample consensus technique, or by comparing the distance between the key point motion vector and the estimated object motion. If such a distance is greater than a threshold it may be classified as an outlier.

The process of the parametric motion estimation 310, the filtering 312, and the key point classification 314 may be repeated for additional objects, as desired.

As a result of the classification process, the system has identified the first class of dominant or background motion and the second class of object motion. For both classes of motion, the motions may be characterized in the form of a set of parameters, such as, translation, rotation, scaling, affine, perspective, and/or homography. Likewise, the system may identify a plurality of different objects and object motions for the frames, as desired. The motions for this plurality of objects, including foreground and background objects, may be determined in a sequential manner as indicated in FIG. 5, or in a parallel manner. Multiple parametric motions for this plurality of objects may also be determined using multiple-model estimation or clustering methods.

The system may then combine the parametric motion models for multiple moving areas, such as the background area and each of the moving objects to generate a consistent dense motion field for the video frame that may be utilized for increased accuracy motion compensated interpolation. Based upon each of the classified object(s) and the background key points, the system may compute 2-dimensional spatial histograms 320 for the object(s) and the dominant regions, respectively. To compute the spatial histograms 320, the frame may be sub-divided into a grid of non-overlapping and/or overlapping blocks of a predetermined and/or non-predetermined size. For example, the size of the block may be set to non-overlapping blocks of 30 by 30 pixels. The 2-dimensional spatial histogram may be computed by counting the number of the object and the background key points within each block. Thus, each 2 dimensional histogram bin corresponds to a block in the frame.

Figure 6:
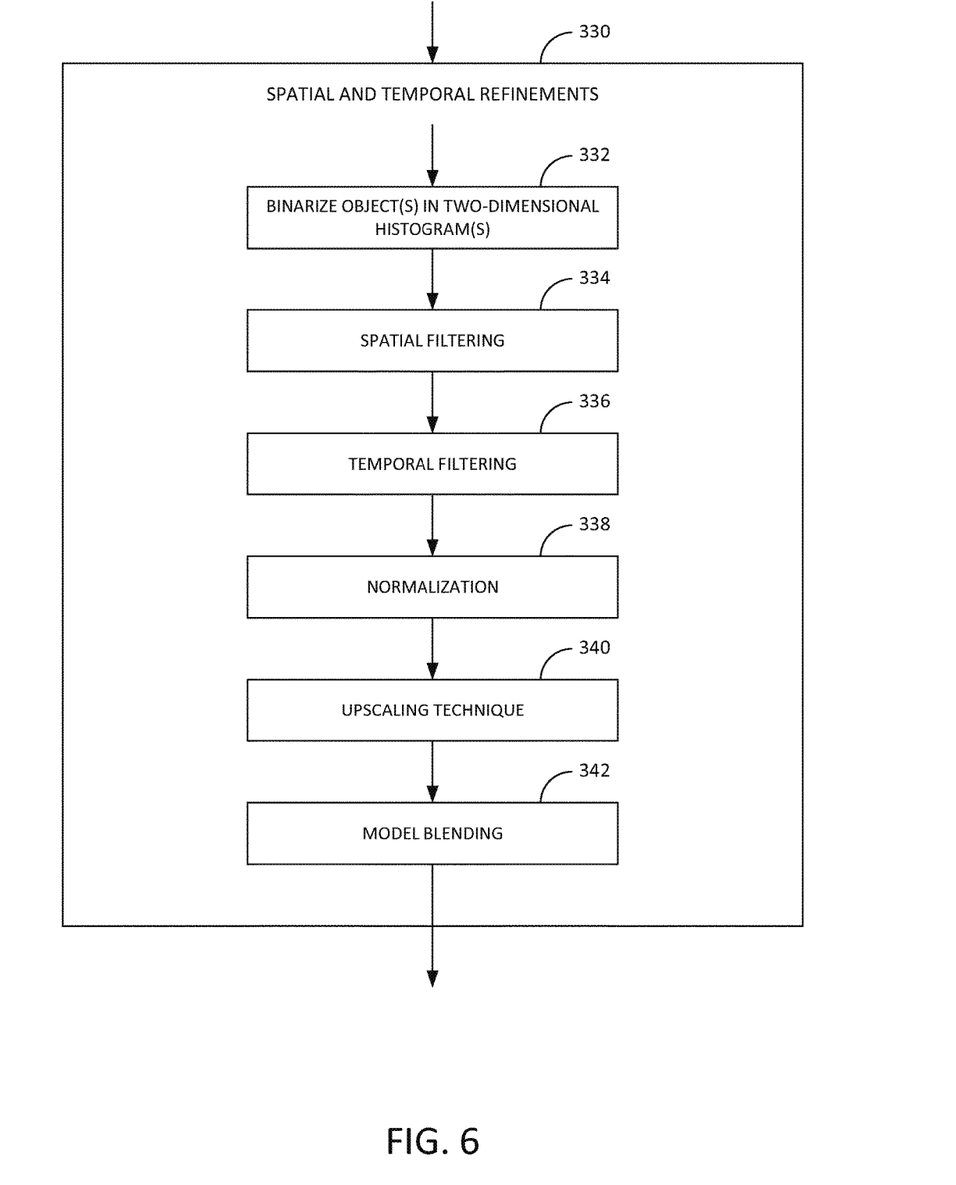
FIG. 6 illustrates exemplary spatial and temporal refinements for the parametric motion model estimation and dense motion field computation process of FIG. 5.

Referring also to FIG. 6, spatial and temporal refinements 330 may be applied to the objects. The spatial and temporal refinements 330 may include initially binarizing each object including the background or dominant motion in the respective 2 dimensional histogram 332. In this manner, if there are non-zero key points in a block, then the value of the block may be set to 1. Otherwise, the value of the block may be set to 0. This results in a 2 dimensional histogram that may be considered a 2 dimensional weight matrix or an image with a small size. A respective weight matrix may be computed for each object and also the background or dominant motion.

Spatial filtering 334 may be used to remove isolated blocks in the binarized object 2 dimensional histogram to reduce misclassifications, such as using a connected component filtering technique. Preferably after the spatial filtering 334, a temporal filtering 336 may be used to refine the shape of the object for temporal consistence as follows: $Y(t)=\beta*Y(t-1)+(1-\beta)*y(t)$. $y(t)$ represents the current object weighting matrix without filtering at the time stamp t, $Y(t-1)$ represents the filtered object weighting matrix after filtering at the time stamp t−1, and $\beta$ represents a weight to control the strength of the filtering, such as 0.2. After the spatial filtering 334 and the temporal recursive filtering 336, the results of the 2 dimensional histogram (or weight matrix) may be normalized 338 within a range from [0 1].

After the normalization 338 the process may apply any suitable upscaling technique 340 to upscale the 2 dimensional histogram to be the same size as the frame for the dominant region and the object histogram(s), respectively. One exemplary upscaling technique 340 is a bilinear upscaling process to increase the spatial smoothness of the weight matrix. For example, the system may use feathering to increase a smooth transition between the foreground and the background. Increasing such smoothness reduces artifacts in the final frame interpolation. The final object and the dominant region weighting matrices may be referred to as $W_1$ and $W_2$, for reference purposes. An additional weighting matrix may be used for each additional object.

After determining the parametric motion of moving object(s) and dominant regions and their corresponding spatial matrices, they may be blended 342 in any suitable manner. One manner of blending 342 is using a weighted sum: $V_B = \Sigma_{i=1}^M W_i V_i$. $V_i$ represents a motion vector field obtained from the $i_{th}$ estimated parametric motion model, and $V_B$ represents a final blended motion vectors field. Alternatively, the motion parameters for multiple moving objects can be blended locally first, and then the final motion vector field can be computed from the blended local motion parameters.

The output of the blended motion vector field may be obtained for the entire frame and used to render an intermediate frame.

Figure 7:
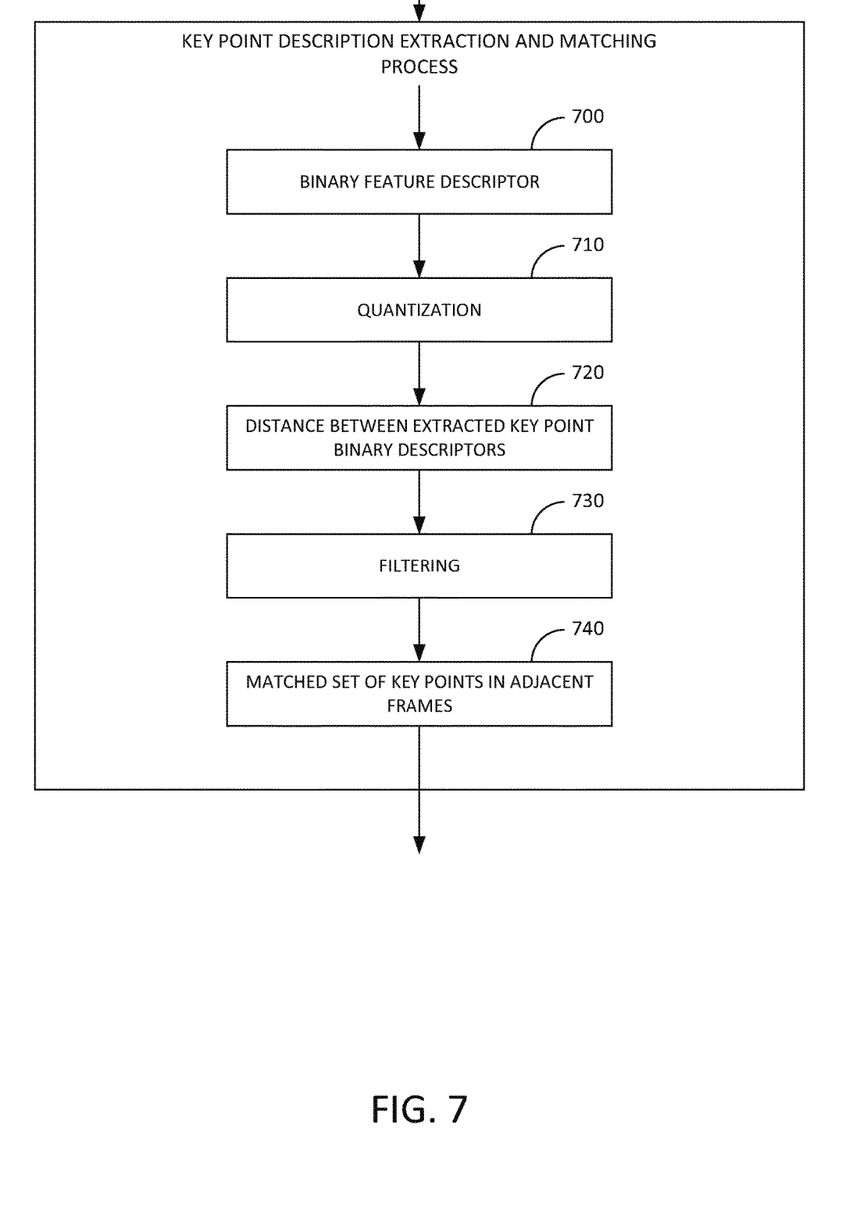
FIG. 7 illustrates another exemplary key point description extraction and matching process for the frame rate conversion process of FIG. 1.

The use of the patch based intensity feature for key point descriptor extraction 210 tends to require significant storage memory. Referring to FIG. 7, a less memory intensive technique makes use of a binary key point descriptor. Preferably, the binary key point descriptor includes local binary pattern features for sparse key point matching. By using binary descriptors for key point matching, the memory required for storing descriptors is significantly reduced. Further, by making use of a Hamming distance to match binary descriptors the computational expense for matching descriptors is significantly reduced.

The binary key point descriptor may include the extraction of a binary feature descriptor 700 in a neighborhood around the key point location. For example, each descriptor may be extracted from a pixel window centered on the respective key point. The window size, may be for example, a 5×5, a 7×7, a 9×9, a 11×11, a 13×13, a 15×15, a 15×17, etc. The use of the binary features reduces the storage requirements for the key point descriptor and the computational expense for key point matching. Any suitable binary feature may be used, such as a local binary pattern feature and a binary robust independent elementary features. Once local binary pattern values are obtained in a neighborhood around a key point, the system may apply a further quantization 710 (e.g., binarization) on each value, such as a binarization threshold of 127. As an example, a 15 by 15 pixel window may result in a 225 bit string as the binary descriptor (1 bit per pixel). Since the key point descriptor based on binary features uses much less memory space than a non-binary feature, the technique uses less memory for storage overall. Local binary pattern feature values may be extracted for only a subset of the pixels in the neighborhood to be included in the descriptor, thus further reducing the size of the descriptor. In the case of binary robust independent elementary features, a binary pattern may be directly extracted from the pixel window, based on comparisons of pairs of pixel values. Pixel value comparisons may be performed for a subset of the pixels in the window. The binary pattern may consist of a bit-string length of 128, 256, or otherwise. A key point matching technique may then be applied to the binary descriptors extracted from the images. Rather than using Euclidean distances between pairs of key point descriptors, a Hamming distance may be used to compute the similarity between pairs of key point descriptors, which is computationally efficient. After the computation of the distance 720, a filtering process 730 may be applied. The filtering process 730, may include for example, the score ratio test 230, key point matching list 240, the determination 250, and the uniqueness selection 260. The filtering 730 results in a matched set of key points in adjacent frames 740.

In another embodiment, the key point description extraction and matching process of FIG. 4 may be combined with the key point description extraction and matching process of FIG. 7, as desired.

Figure 8:
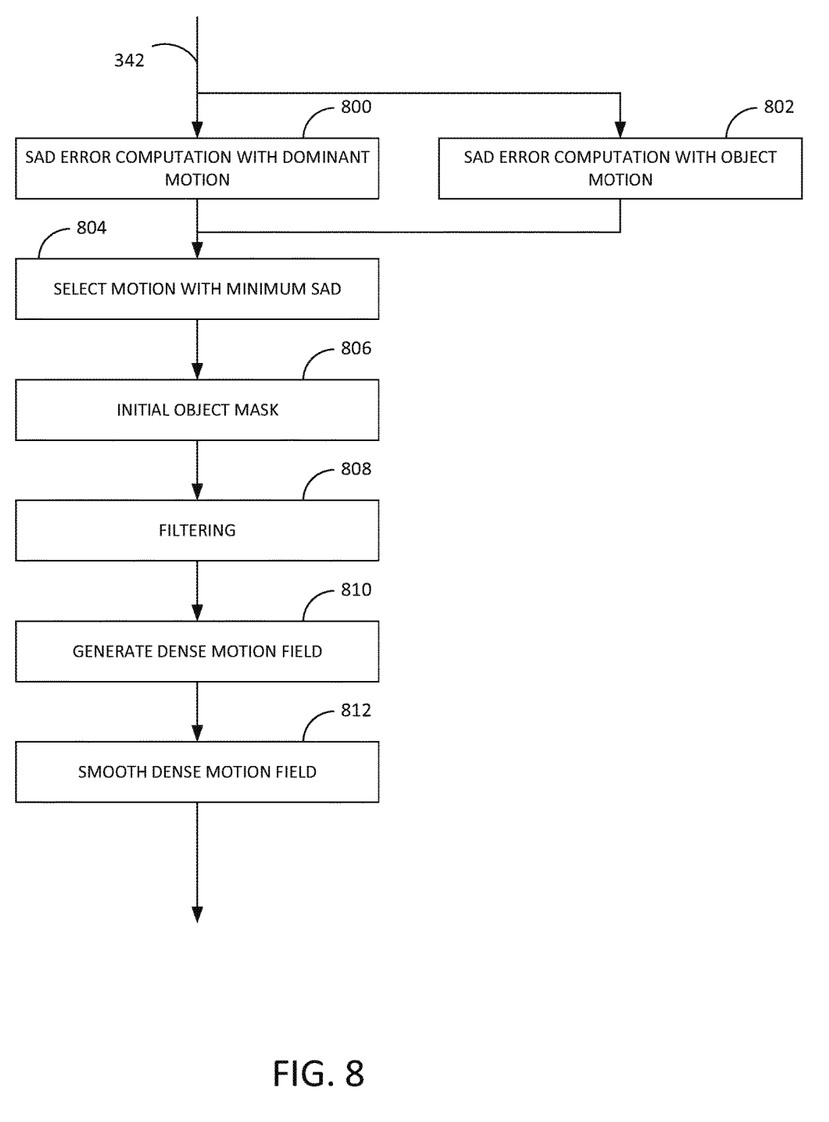
FIG. 8 illustrates an exemplary object motion estimation and device motion vector computation.

Referring to FIG. 8 and also to FIG. 5, after the model blending 342 the system may utilize a motion-compensated error to combine the parametric motions of the background 800 and the foreground objects 802 into a dense motion vector field. The technique may include comparing sum of absolute difference (SAD) errors to select the best motion in a certain location in the image, e.g. for a pixel or pixel block 804.

For each parametric motion that has been computed, the system may compute local motion vectors at a pixel or pixel block location. The local motion vectors may vary across the image depending on the parametric motion coefficients. At each pixel location or pixel block location, the system may have one or more motion vectors, corresponding to the one or more parametric motions estimated earlier. These motion vectors may then be used to motion-compensate a pixel or pixel block and compute the local motion-compensated error. The error may be calculated as the sum of absolute differences (SAD) of pixel values in the first and second frame, taking into account the local motion vector. The error may be calculated as the sum of absolute differences (SAD) of pixel values in the first and second frame without considering motion. Other local characteristics of the first frame may be used to calculate a local error.

By way of example, assume that there is only one moving foreground object in front of a moving background, in the video frames. For those pixels or pixel blocks belonging to the object region, the SAD error with foreground object motion will be smaller than the SAD error based on the background motion. Likewise, for those pixels or pixel blocks belonging to the background region, the SAD error with background motion will be smaller than the SAD error based on the foreground motion. For instance, if the SAD error based on object motion is smaller than the SAD error based on background motion, the corresponding pixel belongs to the object. Otherwise, it belongs to the background. By comparing the SAD errors from the estimated background motion and foreground object motion, the shape of the foreground object can be estimated. This comparison process returns a binary mask with initial foreground shape.

These techniques may be applied to multiple moving objects. By applying parametric motion estimation, each time, one class of motion can estimated and the corresponding inliers may be separated. And then, the parametric motion estimation will be applied to the remaining points. In estimation of the shape of the corresponding foreground object, the SAD errors for different motion vectors corresponding to parametric motions are calculated at the location of a particular pixel or pixel block. The parametric motion with the minimum SAD error is selected to generate the final motion vector for the corresponding pixel or pixel block. In this case, an object mask 806 may be returned identifying the regions of multiple objects.

Given an initial binary object shape mask, spatial filtering 808 may be applied to refine the mask. For instance, the morphological opening operation may be used for removing noise. As another example, the morphological closing operation may be used to smooth the foreground mask. Subsequently, connected component analysis is conducted to remove blobs with a number of pixels less than a certain threshold (for example a threshold of 100). After that, a hole filling operation is applied to further improve the object shape mask. Temporal smoothing may be applied to refine the shape of the objects temporally. One technique for refining the shape of the objects is shown in FIG. 9.

Figure 9:
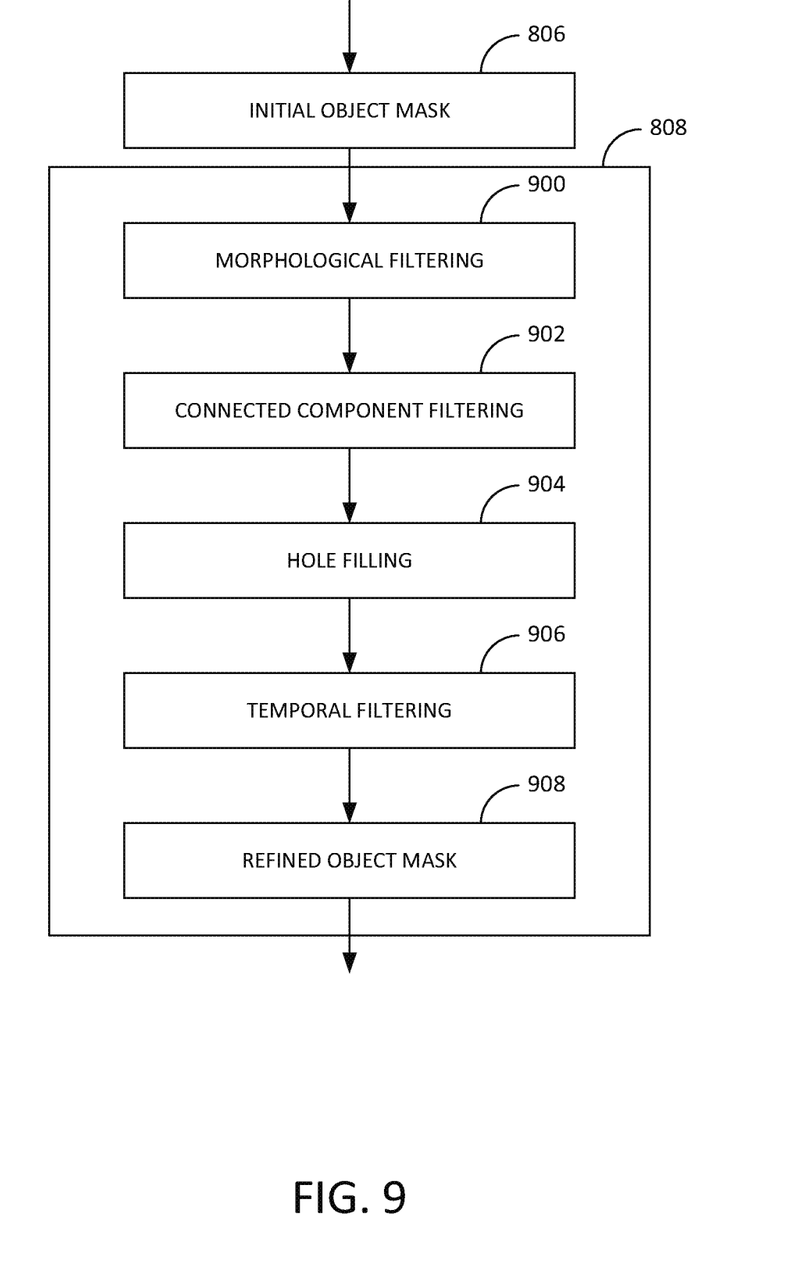
FIG. 9 illustrates an exemplary object shape mask refinement.

Referring to FIG. 9, the filtering process 808 may include a series of one more of the following processes. For example, the initial object mask 806 may undergo a morphological filtering 900, a connected component filtering 902, a hole filling operation 904, a temporal filtering 906, to provide a refined object mask 908.

Once we obtain the refined shape of the objects, motion vectors for all pixels or pixel blocks are combined into a single motion vector field, using parametric motion model blending 810. This motion blending technique may be similar to the motion blending step 342 described before. In order to smooth the motion boundaries, Gaussian filters may be applied on the estimated motion vector fields in x direction and y direction respectively (one example of the parameter setting for the Gaussian filter is the kernel size 5 and variance 1). As other examples, a binomial smoothing filter kernels may be used, or a uniform smoothing filter kernel, or a nonlinear smoothing filter such as a median filter may be used.

The system calculates the motion-compensated output frame based on the final, smoothed, motion vector field 812.

The terms and expressions which have been employed in the foregoing specification are used in as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for frame rate conversion of a video in a digital video system comprising:
    (a) receiving a series of frames having a first frame rate;
    (b) determining a set of sparse key points in a first frame of said series of frames;
    (c) characterizing a plurality of said key points using a key point description extraction process that extracts at least one binary feature descriptor;
    (d) matching each of said characterized plurality of said key points to characteristics of another frame of said series of frames using a matching process based upon the at least one binary feature descriptor;
    (e) estimating a blended parametric motion model based upon the results of said matching process, including: identification of an estimated parametric motion model of a dominant motion combined with a parametric motion model of at least one object;
    (f) based upon said blended parametric motion model, computing a dense motion field;
    (g) computing a new frame for said series of frames based upon said dense motion field for display with a digital video system.

2. The method of claim 1 wherein said set of key points is based upon masking at least one of channel logos and moving text.

3. The method of claim 1 wherein said set of key points include at least one of edges and corner locations.

4. The method of claim 3 wherein said set of key points is modified to increase the overall uniformity of the spatial distribution of said set of key points.

5. The method of claim 1 wherein said estimating identifies outlier key points that do not fit the parametric motion model.

6. The method of claim 5 wherein said estimating is one of: (i) random sample consensus, (ii) a Hough Transform, and (iii) a histogram-based motion estimation technique.

7. The method of claim 1 wherein said blended parametric motion model is further based on identification of an outlier motion that is not included within either of said dominant motion and said motion of said at least one object.

8. The method of claim 7 wherein said parametric motion model for said dominant motion and said parametric motion model for at least one object are combined when being blended.

9. The method of claim 8 wherein a boundary of said at least one object is modified based upon at least one of a spatial refinement and a temporal refinement.

10. The method of claim 1 wherein a boundary of said at least one object is modified based upon at least one of a spatial refinement and a temporal refinement.

11. The method of claim 10 wherein said at least one object is identified based upon clustering of said key points.

12. The method of claim 1 wherein said at least one binary feature descriptor includes local binary pattern features.

13. The method of claim 1 wherein said blended parametric motion model is estimated by combining said parametric motion models based on a measure of local motion-compensated error.

14. The method of claim 13 wherein said measure of local motion-compensated error is applied to a small block of pixels.

15. The method of claim 1 wherein said computing said dense motion field includes assigning a local motion vector to a small block of pixels.

16. The method of claim 15 wherein said local motion vector is based on said blended parametric motion model and a measure of local characteristics of said first frame.

* * * * *